United States Patent
James et al.

(10) Patent No.: US 6,219,537 B1
(45) Date of Patent: Apr. 17, 2001

(54) APPARATUS AND METHOD FOR AN ENHANCED PCS COMMUNICATION SYSTEM

(75) Inventors: Randy James, Brandon; Dallas L. Nash, II, Ridgeland; Jimmy L. Rogers, Jackson, all of MS (US)

(73) Assignee: VBI-2000, L.L.C.

( * ) Notice: Subject to any disclaimer, the term of this patent is extended or adjusted under 35 U.S.C. 154(b) by 0 days.

(21) Appl. No.: 09/063,279

(22) Filed: Apr. 20, 1998

Related U.S. Application Data

(60) Provisional application No. 60/045,089, filed on Apr. 29, 1997.

(51) Int. Cl.[7] ............................... H04Q 7/20; H04Q 7/35
(52) U.S. Cl. ........................ 455/403; 455/5.1; 455/4.2; 348/478; 348/12; 348/13; 348/460; 348/461; 348/467; 348/476
(58) Field of Search ........................ 455/403, 5.1, 4.2; 348/478, 12, 7, 460, 461, 467, 468, 476, 13

(56) References Cited

U.S. PATENT DOCUMENTS

| | | | |
|---|---|---|---|
| 5,677,895 | * | 10/1997 | Mankovitz ........................... 348/478 |
| 5,898,919 | * | 4/1999 | Yuen ..................................... 455/4.2 |
| 5,990,927 | * | 11/1999 | Hendricks et al. .................. 455/4.2 |

* cited by examiner

Primary Examiner—Fan Tsang
Assistant Examiner—Keith Ferguson

(74) Attorney, Agent, or Firm—McDermott, Will & Emery

(57) ABSTRACT

The present application relates to the use of the vertical blanking interval ("VBI") to broadband communications including digital data transmission on the VBI or for a dual VBI/PCS System Capable of enhancing rapid deployment of wireless VBI communications or PCS services to a remote transceiver where no or marginally profitable infrastructure exists. Specifically, the present invention provides a wireless digital communication system having a broadcast interface for encoding message information on the vertical blanking interval (VBI) of a video signal, the message information is encoded to a VBI format so as to form a pre-formatted signal. A broadcast device for transmitting an out-going signal having the pre-formatted signal modulated or otherwise embedded in the VBI of the video signal. The pre-formatted signal is received from the broadcast interface and is transmitted on a carrier of the out-going signal. At least one transceiver exists for receiving the out-going signal and for transmitting a return signal on the carrier of the out-going signal, the transceiver detects clock information relating to the synchronization bits of the broadcast and further includes a decoder for identifying the pre-formatted signal from the out-going signal so as to allow for the decoding of the message information and for displaying such message information to a user of the transceiver; an input device for inputting return message information; an encoding device for encoding the return message information; and a VBI modulating device for modulation or otherwise inserting the return signal on the out-going signal of the broadcast. The present invention further includes an antenna means for detecting the return signal that is supplied to a return signal processor (RSP). The RSP detects the return signal from the carrier of the out-going signal of the broadcast and a message rocessor (MESP) decodes the message information from the return signal. The MESP is adapted to transmit the message information to public or private communications networks or public switches.

35 Claims, 1 Drawing Sheet

APPARATUS AND METHOD FOR AN ENHANCED PCS COMMUNICATION SYSTEM

This application claims benefit of the filing date of Apr. 29, 1997, which was the filing date of the Provisional Patent Application entitled "Apparatus and Method for an Enhanced PCS Communication System" having previously been assigned Application Ser. No. 60/045,089.

FIELD OF THE INVENTION

The present invention pertains to the field of television communication systems and, more particularly, the present invention relates to a system and method of transmitting digital data information in the Vertical Blanking Interval (VBI) for transmission in a wireless communication network.

BACKGROUND OF THE INVENTION

Personal Communication Services ("PCS") describes systems and services which enable a user to communicate anytime, anywhere, and in any form. The basic structure is to allocate a single ID called a Universal Personal Telecommunication (UPT) number to a device allowing voice and data communication of any kind, any time, and anywhere in the world. Because PCS is digital, it can handle data, messaging, paging, and in the future, full multimedia access—besides regular voice telephony—all with one device and one UPT.

A PCS communications system is disclosed in U.S. Pat. No. 5,481,546 to Dinkins. The Dinkins patent discloses an interactive nationwide data service communication system for stationary and mobile battery operated subscriber units that transmit digital communications in the milliwatt power range and contemplates utilization of VBI to send messages; however, the Dinkins system contemplates a plurality of receive-only base stations and local base station repeater cell means distributed throughout the designated area for relaying the low power digital messages within the network. Similarly, a system and method for providing microcellular PCS utilizing embedded switches is disclosed in U.S. Pat. No. 5,457,736 to Cain et al. The system, however, uses existing wireline switches to establish communications between the mobile terminals and an Advanced Intelligent Network. An asymmetric hybrid access system and method is disclosed in U.S. Pat. No. 5,586,121 to Maura et al. The system can utilize communication media to distribute to remote clients high speed data packets on a downstream channel and to transmit return data along an independent upstream channel at a lower speed than the data packet rate transmitted in the downstream channel. The communication media for each of the upstream and downstream channels is selected from one of a CATV distribution network, a cell site, a television transmitter station, a fiber optic network, a wireless network, a telephone network or a satellite communication network. The system is limited in providing full-duplex interactive asymmetric communications between the host server and a plurality of downstream clients using independent upstream channels. However, the known PCS systems do not disclose the concept of utilizing the existing VBI band width for voice (fixed or mobile) along with the technology for return signal processing and signal finessing of the present invention.

Additionally, the enhanced PCS system of the present invention features the receiving of the messaging or PCS information on the VBI carrier by a mobile transceiver, which can retransmit the PCS or return data information on the same carrier to the return signal processor. Finally, the enhanced PCS system of the present invention also features acquiring of the return signal having such message and PCS information on the carrier by the return signal processor, whereby such features are performed at low power and are not disclosed in the prior art.

Additional existing TV data broadcasting communication systems can utilize either the horizontal blanking interval ("HBI") or the vertical blanking interval ("VBI") of the TV signal to deliver point-to-multipoint data delivery, for example, when information is being transmitted simultaneously to many locations. VBI data broadcasting can deliver data simultaneously and at high speed to anyone who needs such information as news, stock quotes, weather radar images, road and traffic conditions and closed captioned text. A standard North American television signal consists of 525 horizontal lines divided into two fields each with 262.5 lines. The first 21 lines of each field comprise the Vertical Blanking Interval ("VBI"); lines 1 to 9 of the VBI are for timing and sequencing; lines 10 through 21 are not allocated, however, line 21 typically has been used to deliver closed caption information to the hearing impaired (via a decoder unit) everywhere the television signal can be received. Therefore, VBI broadcasting uses lines 10 to 20 of the VBI to transport nearly any type of data along with the Several Television data broadcasting systems are known for delivering certain forms of data over a standard TV signal. One such system is the North American Basic Teletext Specification (NABTS) that provides an open standard for the transmission of data over the television, which system equipment is manufactured by Norpak Corporation, Kanata, Ontario. Another system is being offered by Radio Telephone and Television Corporation. As the data is encoded as video it becomes an integral part of the TV signal and, thus, the VBI data is transmitted everywhere that the television signal reaches and furthermore can pass transparently through all carrier media (VHF, UHF, cable, satellite, wireless cable, BTV networks, fiber optic cable, ITFS, etc.). Known VBI systems include a data insertion system at the television network "head end" and an inexpensive VBI data or graphics receiver at each site.

Because VBI data broadcasting only transmits data in only one direction, i.e., high speed, one-way, point-to-multipoint data transmission medium, there is a longfelt need for two-way VBI data broadcasting. As is more fully described herein, the present invention provides such a two-way communication system that utilizes the VBI of the television signal. A VBI data broadcasting system is disclosed in U.S. Pat. No. 5,321,514 to Martinez. The Martinez patent discloses an interactive television and data transmission system that provides transmission of information to multiple users. However, the Martinez patent uses a second carrier for transmitting the down link signals on either the horizontal or vertical blanking intervals and another carrier for transmitting uplink signals.

SUMMARY OF THE INVENTION

Generally, the enhanced PCS communication system of the present invention includes a broadcast means for encoding and broadcasting digital messages on the vertical blanking interval ("VBI") of a television broadcast. The out-going signal with the embedded VBI message is received by a low power VBI transceiver or, alternatively, a VBI/PCS composite transceiver for receiving and transmitting messages for VBI and/or PCS communications. Such transceiver includes an antenna capable of transmitting a return signal or message on the same VBI carrier at low power and relatively low frequencies. The return signal is detected by a return signal processor located at the broadcast means, such return signal processor being able to extract the faint (low power) return signal from the VBI, process the message and to transmit such message to its ultimate address via an interface with one of a satellite communications network, commercial land-lines or the like.

Specifically, the present invention provides a wireless digital communication system having a broadcast interface for encoding message information on the vertical blanking interval (VBI) of a video signal, the message information is encoded to a VBI format so as to form a pre-formatted signal. A broadcast device for transmitting an out-going signal having the pre-formatted signal modulated or otherwise embedded in the VBI of the video signal. The pre-formatted signal is received from the broadcast interface and is transmitted on a carrier of the out-going signal. At least one transceiver exists for receiving the out-going signal and for transmitting a return signal on the carrier of the out-going signal, the transceiver detects clock information relating to the synchronization bits of the broadcast and further includes a decoder for identifying the pre-formatted signal from the out-going signal so as to allow for the decoding of the message information and for displaying such message information to a user of the transceiver; an input device for inputting return message information; an encoding device for encoding the return message information; and a VBI modulating device for modulation or otherwise inserting the return signal on the out-going signal of the broadcast. The present invention further includes an antenna means for detecting the return signal that is supplied to a return signal processor (RSP). The RSP detects the return signal from the carrier of the out-going signal of the broadcast and a message processor (MESP) decodes the message information from the return signal. The MESP is adapted to transmit the message information to public or private communications networks or public switches.

BRIEF DESCRIPTION OF THE DRAWINGS

Further objects and advantages of the invention will become apparent from the following specifications taken in connection with the accompanying drawings, wherein like reference characters identify parts of like functions throughout the different views thereof.

DETAILED DESCRIPTION OF THE INVENTION

Figure 1:
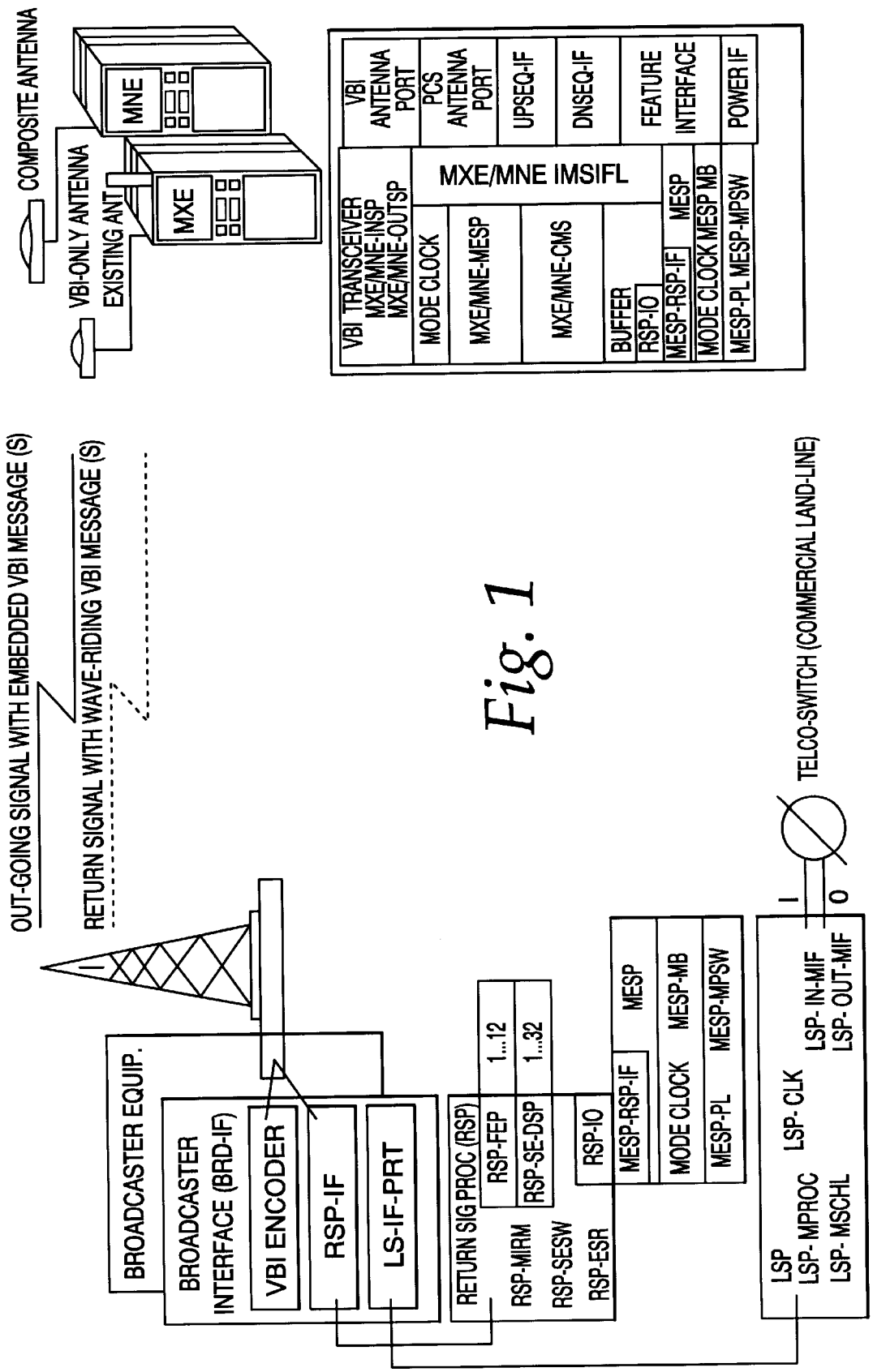
FIG. 1 is a schematic diagram illustrating the enhanced PCS communication system in accordance with the present invention.

FIG. 1 illustrates the major components of an entire enhanced PCS communications system of the present invention. The enhanced PCS communications system includes a broadcaster interface (BRD-IF) that transmits a message on the VBI of a video signal, a mobile system which may be constructed by modifying existing equipment or by a native dual VBI/PCS design, a return signal processor (RSP), a message processor (MESP) having both an encoder and decoder, and a land-line or switch processor (LSP) for connecting to public or private communication networks.

Each of the attributes of the components of the system are described below.

The BRD-IF includes a VBI encoder for the insertion of pre-formatted and encrypted communications messages into broadcaster VBI systems or facilities.

The enhanced PCS system includes a return signal processor interface (RSP-IF) which is located at the broadcaster location. The RSP-IF provides an input port for the RSP, an output port for the LS-IF-PRT for outgoing land-line communications and return loop VBI communications for providing a VBI local node subscriber to VBI subscriber communications.

The Land-Line Switch Interface Port (LS-IF-PRT) provides the broadcast location with an outgoing communications port to the commercial switched network. Standard telco digital G-5 modems and MUX(s) exist between this port and the telco service line or switch.

The system includes at least one mobile system that has a VBI transceiver that includes isolated receive and transmit modules. Multiple level filters and notch block biases exist for all shared I/O and interconnect points. Each module is also shielded to −75 dB at 200–400 MHZ. The receiver module has 30 channel scan capabilities at 30 channels per second. Each module has a minimum message buffer of 256 KB. Antenna ports are dual isolated. The receiver module is specifically designed for quick response VBI-ID/Message identification and subscriber communications processing.

A mode clock (MXE-CLK) can be either a MXE or MNE Mode Clock, that is a Toeplitz-Beta run-time enhanced clock function utilizing input from an on-board clock circuit that is synchronized by periodic VBI embedded clock bits.

The system has a PCS up-sequence interface (MXE-UPSEQ) that is utilized by the MXE-MESP as an interface to the OEM PCS control logic circuit that is used for mobile-user initiated communications.

The system includes a message processor (MXE-MESP) that can include encoder and decoder modules. The MXE-MESP is an advanced programmable microprocessor circuit with on-board memory for message/communications block buffering. The processor has 8 bidirectional I/O channels, DMA channel(s), external and internal bit-sliced clock cycles, external power point and other features required by the integration.

The system has a PCS down-sequence interface (MXE-DNSEQ). The MXE-DNSEQ is the MXE-MESPs interface to the OEM PCS control logic circuit that is used for incoming communications.

The system has a PCS feature interface (MXE-FETSEQ). The MXE-FETSEQ is the MXE-MESPs interface to the OEM PCS power control circuitry, control logic and all other native feature control sequences.

The system has a manufacturer-specific interface logic (MXE-MSIFL), whereby the MXE-MSIFL is the specific interface logic/hardware required for the interaction between the VBI extension modules and OEM PCS control points.

The system has a manufacturer-specific external VBI antenna port for connecting to an antenna for receiving and transmitting message information on the VBI of the video signal. The VBI antenna port is a modification to the OEM PCS product to allow attachment of an external VBI-specific antenna. It is contemplated that a connector is an SMB bulkhead connector with external female gender or a sub-miniature snap connector.

An external VBI antenna is provided and may be constructed from a multi-spectral, frequency-specific mag-mount patch antenna. The external VBI antenna can be an integrated VBI/PCS external antenna, which is a multi-spectral, multi-domain, multi-layer strip antenna capable of being mag-mounted.

The mobile system has a communications mode selector (MXE-CMS), whereby the MXE-CMS is the logic module that interfaces to the OEM PCS through the MXE-MSIFL, MXE-FETSEQ and MXE-MESP. Other optional configurations are contemplated when modifying an OEM specific product, and it is understood that those skilled in the art may make changes in form and details of the invention as shown and described with reference to the preferred embodiments hereof without departing from the spirit and scope of the invention.

In an alternative embodiment, the mobile system may be a native VBI/PCS design (MNE), that includes a composite transceiver (MNE-CTR). The VBI composite transceiver has isolated receive and transmit modules for both VBI and PCS communications. Multiple level filters and notch block biases exist for all shared I/O and interconnect points. Each module is also shielded to −75 dB at 200–400 MHZ and −5 dB at PCS frequencies. The VBI receiver module has 30 memory channel capacity and can scan at 30 channels per second. Each module has a minimum message buffer of 256 KB. Antenna ports are dual isolated. The VBI receiver module is specifically designed for quick response VBI-ID/ Message identification and subscriber communications processing. The MNE can utilize a mode clock (MNE-CLK), a PCS up-sequence interface (MNE-UPSEQ), a message processor having an encoder and decoder circuitry (MNE-MESP), a PCS mode interface (MNE-PCSMIF) or PCS feature interface (MXE-FETSEQ) as has been previously described herein. In this alternative embodiment, the MNE processor (MNE-PROC) can be an expanded programmable microprocessor circuit capable of providing additional features only available with a fully designed integrated system and narrow band PCS paging. The mobile unit can further utilize the integrated VBI/PCS external/internal antenna, as has been previously described herein. Alternatively, an expanded multi-mode antenna (EXP-MMA) can be utilized, whereby the EXP-MMA is an active, increased-gain antenna with on-board signal filtering. It is a multi-mode, strip antenna with added narrow band PCS frequency sensitivity, capable of being mag-mounted. A communications mode selector (MNE-CMS) can be utilized so as to provide additional functionality as has previously been described herein.

In an alternative embodiment, an expanded narrow-band two-way paging interface (2WP-IF) can be provided in the MXE or MNE mobile unit. The 2WP-IF is additional discretionary logic for the processing and the interface of narrow band PCS pages to the MNE-PROC.

The enhanced PCS communications system includes a return signal processor (RSP) that includes an RSP front-end processor (RSP-FEP). The RSP-FEP is primarily comprised of a matrix interleaved filter bank (RSP-FB1–12), channel selectable amplifiers (RSP-AMP1–7) and a composite signal segmentation processor (RSP-SSP). The RSP-SSP provides further channelization of VBI signals for input to the receiver module (RSP-MIRM). The RSP further has a multiple isolated receiver module (RSP-MIRM) for multiple channel reception of spread-channel communications and time-sensitive channel/signal consolidation for input to one or more signal extraction DSP's (RSP-SE-DSP1–32). The RSP further has a signal extraction DSP's (RSP-SE-DSP1–32), whereby the RSP-SE-DSP1–32 is a programmable DSP bank that processes and enhances the return signal using a variety of combination-parallel FFT, polynomial time reduction, and Bayesian noise reduction algorithms. The re-consolidation output is sent to the RSP-ESR for processing by the RSP-SESW software. The RSP operates and is controlled by known signal extraction software (RSP-SESW) that uses known algorithms and techniques. An extracted signal processor (RSP-ESR) is utilized whereby the RSP-ESR processor in conjunction with the RSP-SESW software, provides final processing of the extracted signal (message/communications) and forwards results to the I/O interface (RSP-IO) for message processing by the MESP. The RSP further uses a RSP process signal external I/O interface (RSP-IO). The RSP-IO is a multi-shielded, high-speed, bi-directional I/O port with discretely shielded data lines.

The system of the present invention uses a message processor having encoder and decoder (MESP) circuitry. The MESP includes a RSP interface (MESP-RSP-IF), whereby the MESP-RSP-IF is the MESP side of the I/O port to the RSP. The MESP includes a MNE/MXP interface (MESP-MNP-IF, MESP-MXP-IF). The MNE/MXP interface is a series of interface lines to the MNE processor or MXP-SEQ-IF (UP or DOWN Sequence). The mode clock (MBSP-CLK) provides synchronization of the system with the transmission of VBI messaging information as has been described herein. The MESP circuitry can be included on a MESP Motherboard (MESP-MB). The MESP-MB is a micro-sized discrete logic motherboard providing carrier surface for the MESP-PL processor, buffered memory, clock & control, power distribution, DMA channel and high-speed I/O channels. The MESP can advantageously utilize programmable logic chips (PLC's)(herein MESP-PL). The MESP-PL is the programmable microprocessor specifically designed for execution of the message/communications software (MESP-MPSW).

The MESP can advantageously be controlled by message processing software. The MESP message processing software (MESP-MPSW) can be an embedded assembly of low level, processor-specific code designed to manage and process multiple-task requests initiated by the host device for processing message information. The MESP-MPSW can be utilized in the mobile or fixed transceiver (MXE/MNE), or in the return signal processor (RSP) for managing MESP communications, including task management, message protocols (formatting/de-formatting), error processing, device interface, I/O processing, timing verification, time-stamp formulation and other VBI specific and host-specific application tasks and the like.

The system of the present invention includes a land line/switch processor (LSP) for sending an incoming message from public or private communication networks to the mobile unit on the VBI, and forwards a message received by the RSP and extracted from the VBI to public or private communication networks according the apparatus, system and method of the present invention. An incoming message can be received from the land line interface (LSP-IN-MIF) and an outgoing message can be sent to the land line interface (LSP-OUT-MIF). The incoming and outgoing interfaces provide bidirectional, buffered communications between the message processor (LSP-MPROC) and commercial land lines or switches.

As will be readily appreciated by those skilled in the art, a message processor (LSP-MPROC) used herein can be comprised of an application-specific multiplexor, task management applicationware, a message parser and message encoding/decoding sub-module. The present invention utilizes a message scheduler (LSP-MSCHL) for handling the pacing and flow of VBI/PCS message traffic. A mode clock is utilized and synchronized using the data bits transmitted throughout the communications cycle, according to the present invention as described herein, and is designated (LSP-CLK).

In operation, communications may be initiated from or to either the MXE or MNE transceiver; an un-modified or otherwise standard PCS device whether narrow or broadband communications; an unmodified or otherwise standard AMPS device; a conventional land-line (LL) or other public or private communications network interface through the LSP interface; and an internally generated system check (SYS) or status verification task check for monitoring the operation of the system and its system and/or sub-system components.

Direct communication paths are summarized in Table 1.

TABLE 1

| From: | MXE | MNE | PCS | AMPS | LL | SYS |
|---|---|---|---|---|---|---|
| To: MXE | X | X | | | | X |
| MNE | X | X | | | | X |
| PCS | | | | | | |
| AMPS | | | | | | |
| LL | | | | | | |
| SYS | X | X | | | | |

As is illustrated in Table 2, the indirect communication paths are shown via a VBI control system or RSP or MESP-MPSW/LSP.

TABLE 2

| From: | MXE | MNE | PCS | AMPS | LL | SYS |
|---|---|---|---|---|---|---|
| To: MXE | X | X | X | X | X | X |
| MNE | X | X | X | X | X | X |
| PCS | X | X | | | | |
| AMPS | X | X | | | | |
| LL | X | X | | | | |
| SYS | X | X | | | | X |

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A wireless digital communication system comprising:

broadcast interface means for encoding message information on the vertical blanking interval (VBI) of a video signal, said message information being encoded to the VBI format so as to form a pre-formatted signal;

broadcast means for transmitting an out-going signal, said out-going signal having said pre-formatted signal being modulated and embedded in the VBI of said video signal, said pre-formatted signal being received from said broadcast interface means and being transmitted on a carrier of said out-going signal;

at least one transceiver means for receiving said out-going signal and for transmitting a return signal on said carrier of said out-going signal, said transceiver means having means for detecting clock information relating to the synchronization or timing of said broadcast means, said transceiver means further including:

decoding means for identifying said pre-formatted signal from said out-going signal and for decoding said message information;

output means for outputting said message information to a display means;

input means for inputting return message information;

encoding means for encoding said return message information; and modulating means for inserting said return signal on the out-going signal of the broadcast means, antenna means for detecting said return signal, return signal processor (RSP) means for detecting said return signal from said carrier of the out-going signal of the broadcast means, message processor (MESP) means for decoding of said return signal having said return signal message information, said MESP means adapted to transmit said return signal message information to a communications network.

2. The wireless digital communications system of claim 1 whereby said transceiver is fixed in its geographic location.

3. The wireless digital communications system of claim 1 whereby said transceiver is a mobile unit.

4. The wireless digital communications system of claim 1 whereby said transceiver means includes a VBI antenna.

5. The wireless digital communications system of claim 1 whereby said transceiver means includes a composite antenna for detecting said preformatted signal on said out-going signal and for transmitting said return signal on said out-going signal, said composite antennae being capable of transmitting and receiving both VBI and broadband communications.

6. The wireless digital communications system of claim 1 whereby said decoding means further detects synchronization bits of said pre-formatted signal and setting an internal clock of said transceiver means, said internal clock of said transceiver means being used for transmitting said return signal.

7. An enhanced PCS wireless digital communication system, comprising:

broadcast interface means for encoding message information on the vertical blanking interval (VBI) of a video signal, said message information being encoded to the VBI format so as to form a pre-formatted signal;

broadcast means for transmitting an out-going video signal having said pre-formatted signal embedded on the VBI of said video signal, said pre-formatted signal being received from said broadcast interface means and inserted in a carrier of said video signal;

a transceiver means for receiving said out-going video signal and for transmitting a return signal on the VBI of said carrier of said video signal, said transceiver means having means for detecting clock information relating to the synchronization or timing of the broadcast means, said transceiver means further including:

decoding means for identifying said pre-formatted signal from said out-going video signal and for decoding said message information;

output means for outputting said message information to a display means; and input means for inputting return message information;

encoding means for encoding said return message information for preparation for insertion on a return signal for insertion on the out-going signal of the broadcast means;

antenna means for detecting said return signal;

return signal processor (RSP) means for detecting said return signal from said carrier of said out-going signal of the broadcast means, message processor (MESP) means for decoding of said return signal having said return signal message information, and for transmitting said return signal message information to a switch.

8. The enhanced PCS wireless digital communications system of claim 7 whereby said transceiver is fixed in its geographic location.

9. The enhanced PCS wireless digital communications system of claim 7 whereby said transceiver is a mobile unit.

10. The enhanced PCS wireless digital communications system of claim 7 whereby said transceiver means includes a VBI antenna.

11. The enhanced PCS wireless digital communications system of claim 10 whereby said transceiver means includes a VBI/Broadband PCS composite antenna for detecting said pre-formatted signal on said out-signal and for transmitting said return signal on said transmitted video signal a wave-riding VBI message.

12. The enhanced PCS wireless digital communications system of claim 11 whereby said decoding means further detecting a synchronization bit of said pre-formatted signal and setting an internal clock of said transceiver means, said internal clock of said transceiver means being used for transmitting a return signal on the VBI carrier.

13. A wireless digital communication system comprising:
broadcast interface means for encoding message information on the vertical blanking interval (VBI) of a video signal, said message information being encoded to the VBI format so as to form a preformatted signal;
broadcast means for transmitting an out-going signal, said out-going signal having said preformatted signal being modulated and embedded in the VBI of said video signal, said preformatted signal being received from said broadcast interface means and being transmitted on a carrier of said out-going signal; and
at least one transceiver means for receiving said out-going signal and for transmitting a return signal on said carrier of said out-going signal, said at least one transceiver means having means for detecting clock information relating to the synchronization or timing of said broadcast means.

14. The wireless digital communications system of claim 13 whereby said return signal is transmitted in the VBI carrier of said out-going signal.

15. The wireless digital communications system of claim 13 whereby said at least one transceiver means is fixed in its geographic location.

16. The wireless digital communications system of claim 13 whereby said at least one transceiver means is a mobile unit.

17. The wireless digital communications system of claim 13 whereby said at least one transceiver means includes a VBI antenna.

18. The wireless digital communications system of claim 13 whereby said at least one transceiver means includes a composite antenna for detecting said preformatted signal on said out-going signal and for transmitting said return signal on said out-going signal, said composite antennae adapted to transmit and receive both VBI and broadband communications.

19. The wireless digital communications system of claim 13 further comprising a decoding means for detecting synchronization bits of said preformatted signal and setting an internal clock of said at least one transceiver means, said internal clock of said at least one transceiver means being used for transmitting said return signal.

20. A wireless digital communication system comprising:
a broadcast interface that encodes message information on the vertical blanking interval (VBI) of a video signal, said message information being encoded to the VBI format so as to form a preformatted signal;
a broadcast location from which an outgoing signal is transmitted, said out-going signal having said preformatted signal being modulated and embedded in the VBI of said video signal, said preformatted signal being received from said broadcast interface and being transmitted on a carrier of said out-going signal; and
at least one transceiver that receives said out-going signal and that transmits a return signal on said carrier of said out-going signal, said at least one transceiver adapted to detect clock information relating to the synchronization or timing of signals transmitted from said broadcast location.

21. The wireless digital communications system of claim 20 whereby said return signal is transmitted in the VBI carrier of said out-going signal.

22. The wireless digital communications system of claim 20 whereby said at least one transceiver is fixed in its geographic location.

23. The wireless digital communications system of claim 20 whereby said at least one transceiver is a mobile unit.

24. The wireless digital communications system of claim 20 whereby said at least one transceiver includes a VBI antenna.

25. The wireless digital communications system of claim 20 whereby said at least one transceiver includes a composite antenna that detects said preformatted signal on said out-going signal and that transmits said return signal on said out-going signal, said composite antennae being adapted to transmit and receive both VBI and broadband communications.

26. The wireless digital communications system of claim 20 further comprising a decoder that detects synchronization bits of said preformatted signal and sets an internal clock of said at least one transceiver, said internal clock of said at least one transceiver being used to transmit said return signal.

27. A wireless digital communication system comprising:
a broadcast interface that encodes message information on the vertical blanking interval (VBI) of a video signal, said message information being encoded to the VBI format so as to form a preformatted signal;
a broadcast location from which an out-going video signal is transmitted, said out-going video signal having said preformatted signal embedded in the VBI of said video signal, said preformatted signal being received from said broadcast location and being transmitted on a carrier of said out-going video signal; and
at least one transceiver that receives said out-going video signal and that transmits a return signal on the VBI of said carrier of said out-going video signal, said at least one transceiver adapted to detect clock information relating to the synchronization or timing of signals transmitted from said broadcast location.

28. An enhanced PCS wireless digital communication system, comprising:
a broadcast interface that encodes message information on the vertical blanking interval (VBI) of a video signal, said message information being encoded to the VBI format so as to form a preformatted signal;
a broadcast location from which an out-going signal is transmitted, said out-going signal having said preformatted signal being modulated and embedded in the VBI of said video signal, said preformatted signal being received from said broadcast interface and being transmitted on a carrier of said out-going signal;

at least one transceiver that receives said out-going signal and that transmits a return signal on said carrier of said out-going signal, said at least one transceiver adapted to detect clock information relating to the synchronization or timing of signals transmitted from said broadcast location, said at least one transceiver further including:
a decoder that identifies said preformatted signal from said out-going signal and that decodes said message information;
a display that displays said message information;
an input device that inputs return message information;
an encoder that encodes said return message information;
a modulator that inserts said return signal on the out-going signal from said broadcast location;
an antenna that detects said return signal;
a return signal processor (RSP) that detects said return signal from said carrier of said out-going signal from said broadcast location; and
a message processor (MESP) that decodes said return signal having said return signal message information, said MESP adapted to transmit said return signal message information to a communications network.

29. An enhanced PCS wireless digital communication device, comprising:
at least one transceiver that receives an out-going signal, said out-going signal having a preformatted signal being modulated and embedded in the VBI of a video signal, and that transmits a return signal on a carrier of said out-going signal, said at least one transceiver adapted to detect clock information relating to the synchronization or timing of transmitted signals, said at least one transceiver firther including:
a decoder that identifies said preformatted signal from said out-going signal and that decodes message information in said preformatted signal;
a display that displays said message information;
an input device that inputs return message information;
an encoder that encodes said return message information; and
a modulator that inserts said return signal on the out-going signal.

30. The enhanced PCS wireless digital communication device of claim 29 whereby said return signal is transmitted in the VBI carrier of said out-going signal.

31. An enhanced PCS wireless digital communication system, comprising:
a broadcast interface that encodes message information on the vertical blanking interval (VBI) of a video signal, said message information being encoded to the VBI format so as to form a preformatted signal;
a broadcast location from which an out-going signal is transmitted, said out-going signal having said preformatted signal being modulated and embedded in the VBI of said video signal, said preformatted signal being received from said broadcast interface and being transmitted on a carrier of said out-going signal, said broadcast location further including:
an antenna that detects a return signal;
a return signal processor (RSP) that detects said return signal from said carrier of said out-going signal from said broadcast location; and
a message processor (MESP) that decodes said return signal, said MESP adapted to transmit message information in said return signal to a communications network.

32. The enhanced PCS wireless digital communication system of claim 31 whereby said return signal is transmitted in the VBI carrier of said out-going signal.

33. A method of communicating in a wireless digital communication system, comprising the steps of:
encoding message information on the vertical blanking interval (VBI) of a video signal, said message information being encoded to the VBI format so as to form a preformatted signal;
transmitting an out-going signal having said preformatted signal being modulated and embedded in the VBI of said video signal, said preformatted signal being received from said broadcast interface and being transmitted on a carrier of said out-going signal; and
receiving said out-going signal and transmitting a return signal on said carrier of said out-going signal, and detecting clock information relating to the synchronization or timing of transmitted signals.

34. A method of communicating in a wireless digital communication system, comprising the steps of:
encoding message information on the vertical blanking interval (VBI) of a video signal, said message information being encoded to the VBI format so as to form a preformatted signal;
transmitting an out-going video signal having said preformatted signal embedded in the VBI of said video signal, said preformatted signal being received from said broadcast location and being transmitted on a carrier of said out-going video signal; and
receiving said out-going video signal and transmitting a return signal on the VBI of said carrier of said out-going video signal, and detecting clock information relating to the synchronization or timing of transmitted video signals.

35. A method of communicating in an enhanced PCS wireless digital communication system, comprising the steps of:
encoding message information on the vertical blanking interval (VBI) of a video signal, said message information being encoded to the VBI format so as to form a preformatted signal;
transmitting an out-going signal having said preformatted signal being modulated and embedded in the VBI of said video signal, said preformatted signal being received from said broadcast interface and being transmitted on a carrier of said out-going signal;
receiving said out-going signal and detecting clock information relating to the synchronization or timing of transmitted signals;
identifying said preformatted signal from said out-going signal and decoding said message information;
displaying said message information;
inputting return message information;
encoding said return message information;
inserting and transmitting a return signal on said carrier of said out-going signal;
detecting said return signal from said carrier of said out-going signal; and
decoding said return signal having said return signal message information, and transmitting said return signal message information to a communications network.

* * * * *